Nov. 4, 1969    B. J. CARLSON ET AL    3,476,445
LINEAR BALL BUSHING
Filed Aug. 3, 1967    3 Sheets-Sheet 2
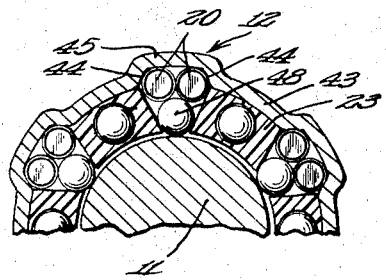
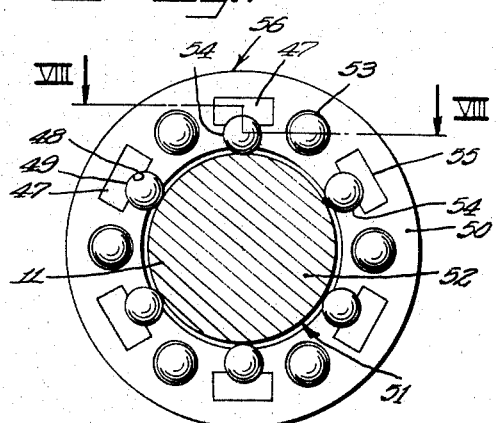
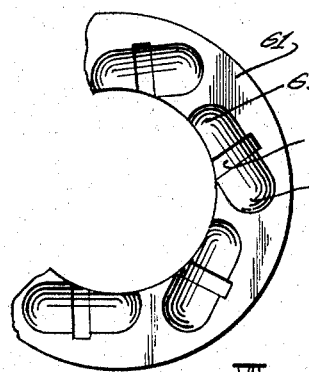
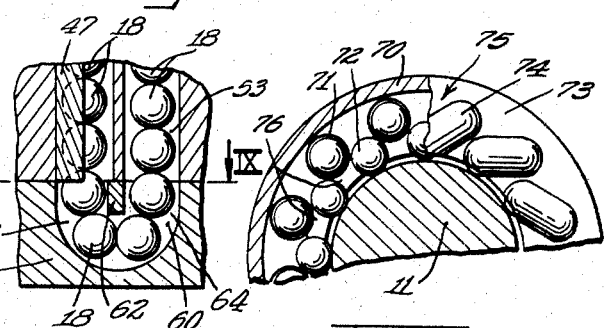
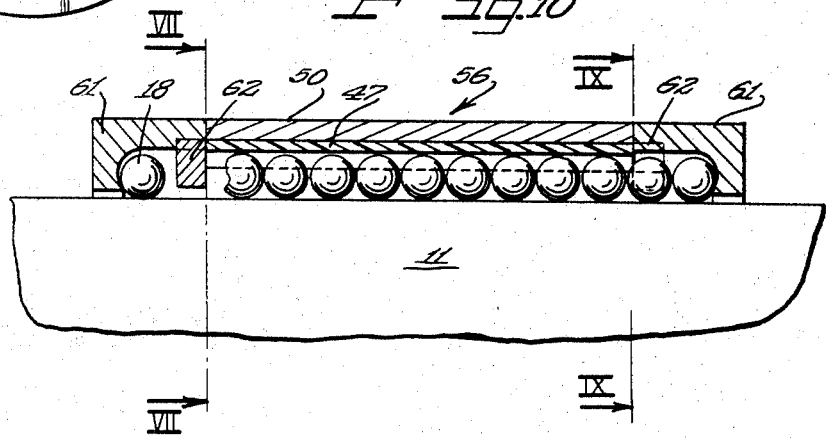
INVENTORS
Burnette J. Carlson
John H. Johnson
BY Hill, Sherman, Meroni, Gross & Simpson ATTORNEYS

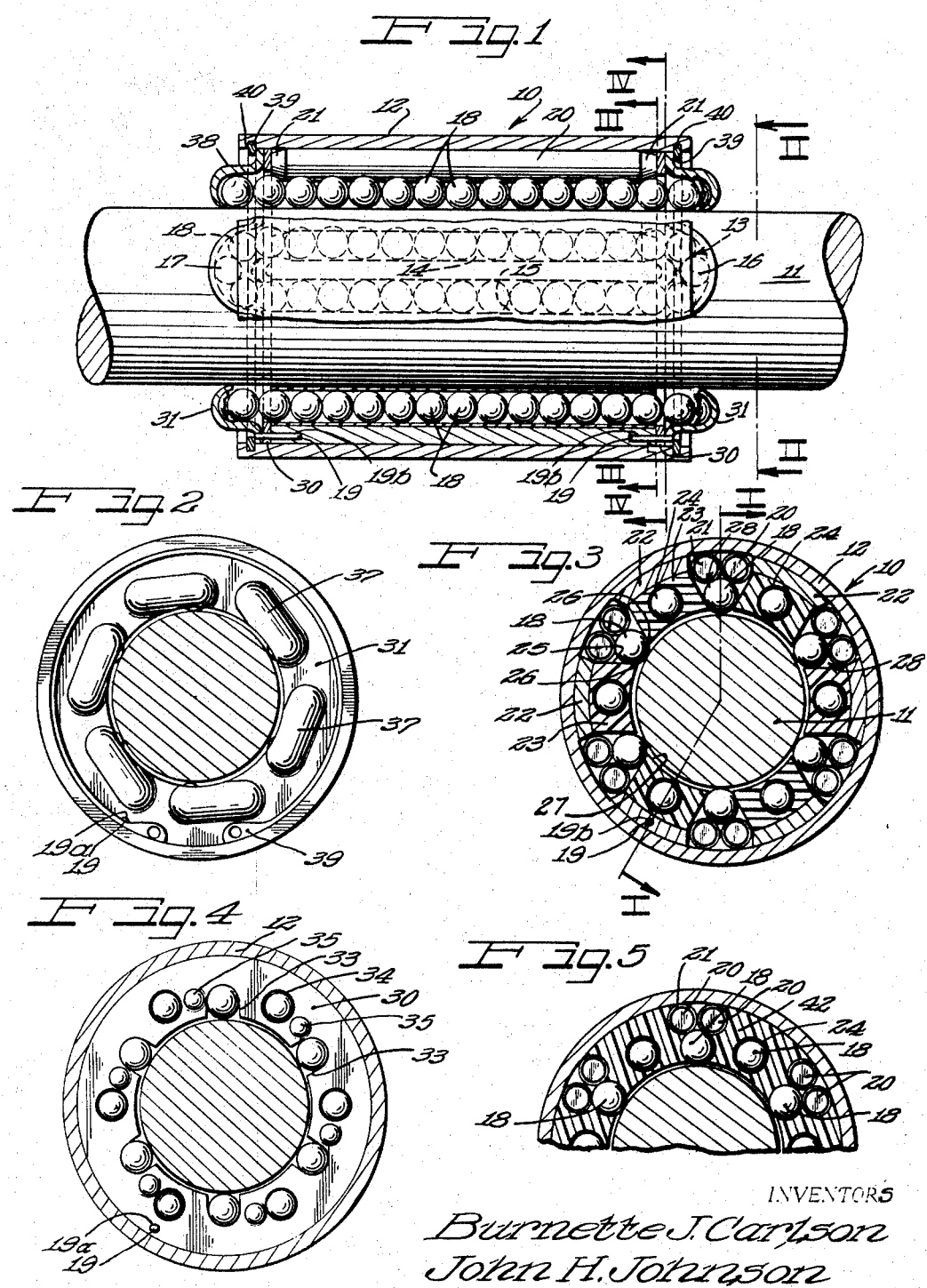

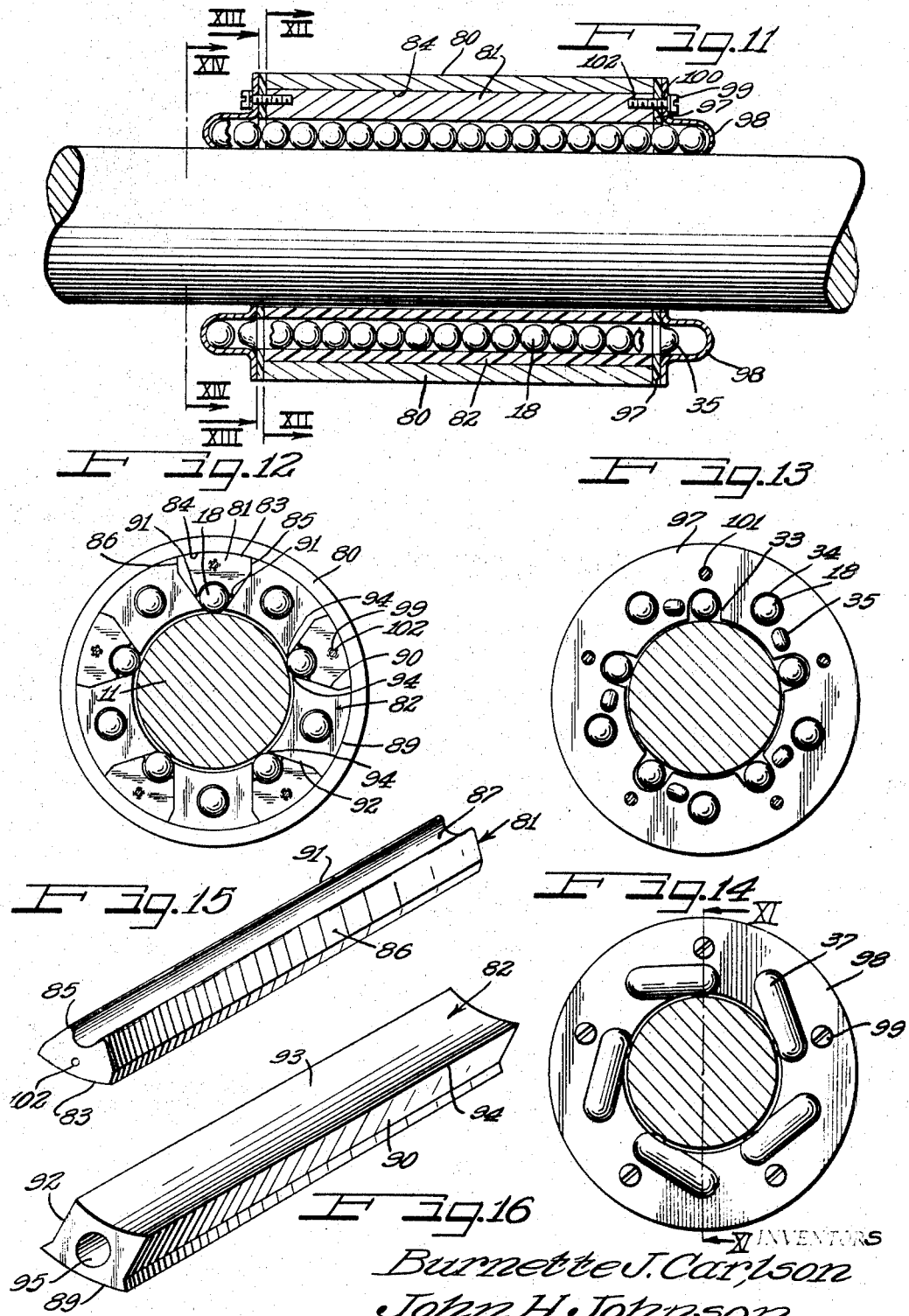

United States Patent Office 3,476,445
Patented Nov. 4, 1969

3,476,445
LINEAR BALL BUSHING
Burnette J. Carlson and John H. Johnson, Jamestown, N.Y., assignors to TRW Inc., Cleveland, Ohio, a corporation of Ohio
Filed Aug. 3, 1967, Ser. No. 658,118
Int. Cl. F16c 17/00, 21/00, 19/00
U.S. Cl. 308—6       11 Claims

ABSTRACT OF THE DISCLOSURE

A linear motion bearing for axial movement along a shaft placed through the bearing which has endless ball races between the bearing and the shaft. The balls in a portion of each of the races are pressed into loaded bearing relationship with the surface of the shaft by removable raceway surface members which may comprise rods, contoured strips, tubes or the like which can be removed from the bearing housing for inspection, repair or replacement.

BACKGROUND OF THE INVENTION

Field of the invention

This invention relates to antifriction bearings and more particularly to linear motion antifriction bearings having endless ball raceways, the bearing portions of which are removable.

Prior art

Antifriction linear motion bearings which allow relative movement between a shaft and the bearing housing in axial directions are known to the art. Such linear motion bearings generally contain endless bearing raceways filled with ball bearings. A portion of each endless bearing raceway contains a bearing surface to place the ball in loaded bearing engagement with the surface of a shaft received within the bearing housing. In prior art linear motion bearings, as for example in the J. B. Thomson Patent No. 2,576,269 and the K. Hulck et al. Patent No. 3,070,405, the bearing surface which loads the balls into bearing relationship with the shaft is provided by longitudinal depressions in the bearing housing, which depressions bring the interior surface of the bearing housing into loaded contact with the balls. Thereafter, as use of the bearing generates wear erosion of the raceways, the inner surface of the housing at the depressed areas becomes worn, necessitating eventual replacement of the housing.

SUMMARY

The present invention overcomes the objections of the prior art by providing bearing surface raceway members independent of the bearing housing which can be removed for inspection, repair or replacement. In a preferred embodiment of the invention, the bearing surface is provided by two elongated rods extending axially within the bearing housing. The balls are in loaded engagement with and between the surfaces of the rods and the surface of the shaft received within the bearing housing. In other embodiments, the bearing surface can be provided by an elongated contoured strip or by hollow tubes. Because the bearing surfaces are removable from the housing and can be replaced independently of the housing, it is no longer necessary to replace the housing as wear develops as is the case with the prior art linear bearings.

It is, therefore, an object of this invention to provide an improved linear motion bearing in which the bearing surfaces of the ball raceways are independent of the bearing housing.

It is another object of this invention to provide an improved linear motion bearing having removable bearing surface raceways.

It is another object of this invention to provide a linear ball bearing having endless raceways, the bearing surface portions of which are independent of the bearing housing and removable therefrom.

It is yet another and more specific object of this invention to provide a linear motion ball bearing having endless raceways, the bearing surface portions of each raceway being formed by two elongated rods which are removable from the bearing housing.

It is another specific object of this invention to provide a linear motion ball bearing having endless raceways, the bearing surface portions of which are comprised of contoured strips removable from the bearing housing.

It is yet another specific object of this invention to provide a linear motion ball bearing having endless raceways, the bearing surface portions of which are provided by hollow tubes.

BRIEF DESCRIPTION OF THE DRAWINGS

FIGURE 1 is a cross-sectional view of the bearing of this invention shown with a shaft inserted therethrough and with a portion of the bearing shown in elevation with underlying portions thereof shown by broken lines. The cross-sectional view is taken along the line I—I of FIGURE 3;

FIGURE 2 is an end plan view of the bearing of this invention taken along the line II—II of FIGURE 1 showing the outer end cap and snap ring retainer;

FIGURE 3 is a cross-sectional view of the bearing of this invention taken along the lines III—III of FIGURE 1;

FIGURE 4 is a cross-sectional view of the bearing of this invention taken substantially along the lines IV—IV of FIGURE 1 and showing the inner end ring of the bearing assembly;

FIGURE 5 is a cross-sectional view of another embodiment of the bearing of this invention in a view similar to that of FIGURE 3;

FIGURE 6 is a cross-sectional view of another embodiment of the bearing of this invention in a view similar to that of FIGURE 3;

FIGURE 7 is a cross-sectional view of yet another embodiment of the bearing of this invention taken along the lines VII—VII of FIGURE 10;

FIGURE 8 is a cross-sectional view of the embodiment of the bearing of this invention shown in FIGURE 7 taken generally along the lines VIII—VIII of FIGURE 7;

FIGURE 9 is a fragmentary cross-sectional view of the bearing end cap taken along the lines IX—IX of FIGURE 8;

FIGURE 10 is a fragmentary cross-sectional view of the embodiment of the bearing of this invention which is shown in FIGURES 7, 8 and 9;

FIGURE 11 is a cross-sectional view of another embodiment of the bearing of this invention with a shaft inserted therein. The cross-sectional view is taken along the lines XI—XI of FIGURE 14;

FIGURE 12 is a crosss-sectional view of the bearing of FIGURE 11 taken along the lines XII—XII of FIGURE 11;

FIGURE 13 is a cross-sectional view of the bearing of FIGURE 11 taken along the lines XIII—XIII of FIGURE 11 and showing the inner end cap ring of the bearing assembly;

FIGURE 14 is an end plan view of the bearing of FIGURE 11 taken along the line XIV—XIV of FIGURE 11 showing the outer end cap ring;

FIGURE 15 is a perspective view of a loaded raceway insert of the embodiment shown in FIGURE 11;

FIGURE 16 is a perspective view of an unloaded raceway insert of the embodiment shown in FIGURE 11; and FIGURE 17 is a fragmentary end view of another embodiment of the bearing of this invention with a portion thereof shown in section as similar to FIGURE 3.

DESCRIPTION OF THE PREFERRED EMBODIMENTS

As shown in FIGURE 1, the linear motion bearing 10 of this invention is generally cylindrical in shape and receives a cylindrical shaft 11 therethrough. The bearing 10 consists of a cylindrical housing 12 which contains a plurality of endless ball raceways which have two substantially straight portions 14 and 15 extending axially within the housing 12 and two curved end portions 16 and 17 connecting the ends of the straight portions 14 and 15. The raceways 13 are substantially filled with ball bearings 18. The balls 18 in one of the straight sections 14 of the raceway 13 are in loaded bearing relationship with the surface of the shaft 11. The balls 18 in the other straight portion 15 of the raceway 13 are in an unloaded state and do not contact the surface of the shaft 11. As the bearing assembly 10 and the shaft 11 move relative to each other, the balls 18 rotate around the endless raceway 13, being in loaded bearing state when in the straight portion 14 and unloaded state when in the end portions 16 and 17 and the other straight portion 15.

As best shown in FIGURE 3, a preferred embodiment of the invention is illustrated which has six raceways. However, it is to be understood that a greater or lesser number of raceways can be provided. In the embodiment illustrated, six pairs of rods 20 are equally spaced circumferentially around the interior surface of the housing 12. The surfaces of the rods in each pair contact each other along their axial lengths except at the ends thereof. The end portions 21 of each of the rods are inwardly tapered. The rods 20 form the bearing surface of the loaded straight portion 14 of each raceway 13. The balls 18 in the raceways 13 ride against the surfaces of the rods in each pair.

The pairs of rods are circumferentially separated by six elongated steel inserts 22. The inserts 22 are radially thin and arcuately curved to conform to the interior diameter of the housing 12. The steel inserts 22 are dimensioned so that their sides contact one of the rods in each of the adjacent pairs, thus preventing the rods in each pair from spreading apart.

Bonded to the interior diameter surface of each of the steel inserts 22 are elongated molded blocks 23. The blocks 23 have a radial thickness greater than the diameter of the balls 18 used in the bearing assembly, but less than the distance from the radially inner face of the metal inserts 22 to the surface of the shaft 11. The blocks 23 have an axial bore 24 therethrough. The axial bore 24 has a diameter slightly greater than the diameter of the ball bearings 18. The side walls 25 of the blocks 23 define between adjacent blocks a space 28 having a V-shape converging to a point where the radially innermost side edges 26 of the adjacent blocks 23 are circumferentially spaced apart by a distance less than the diameter of the ball bearings 18. The bottoms 27 of the blocks 23 are arcuately curved so as to be radially spaced from the circumferential surface of the shaft 11.

The axial bores 24 of the blocks 23 serve as the unloaded straight portion 15 of the raceways 13. The straight portions of each raceway are then formed by the spaces 28 between adjacent blocks radially below the pairs of rods 20 and the axial bore of one of the adjacent blocks 23.

The diameters of the rods 20 and the balls 18 are such that a ball 18 riding against the surfaces of a pair of rods 20 in the groove formed between the rods will extend radially inward beyond the bottom 27 of the blocks 23. Because the circumferential distance between the radially innermost side edges 26 of adjacent blocks 23 is less than the diameter of the balls 18, the distance which the balls 18 extend beyond the bottom 27 of the blocks 23 is less than one-half of the diameter of the balls 18. The balls are then prevented from falling out of the space 28 between adjacent blocks 23 by contact with the edges 26 of the blocks 23.

The axial lengths of the metal inserts 22, the blocks 23 and the rods 20 are substantially equal and less than the axial length of the housing 12 which extends beyond the axial ends of the inserts 22, blocks 23 and rods 20.

The axial ends of the bearing assembly 10 are closed by inner and outer end cap rings 30 and 31 which also provide the curved end portions 16 and 17 of the raceways 13.

Each of the end cap rings 30 and 31 has an outer diameter substantially equal to the inner diameter of the housing 12 and an inner diameter greater than the diameter of the shaft 11, but not so great as to expose the axial bores of the blocks 23 when the end cap rings are in their mounted position.

As best shown in FIGURE 4, the inner end cap ring 30 has, in the six raceway embodiment illustrated, six arches or recesses 33 circumferentially spaced around and open to its inner diameter. The arches 33 have a width and height greater than the diameter of the balls 18. The ring 30 also has six circumferentially spaced apertures 34 which extend through the ring and which are spaced equidistant from the arches 33. The axes of the apertures 34 are spaced from the outer diameter of the ring 30 the same distance that the axes of the bores 24 of the molded blocks 23 are spaced from the inner dimeter of the housing 12. The pertures 34 have a diameter equal to the diameter of the bores 24. The ring 30 also has six circumferentially spaced raised domes 35 on its axially outermost face. The domes 35 are positioned between each of the arches 33 and the aperture adjacent to it on one side. No arch 33 and no aperture 34 has more than one dome 35 adjacent it.

The ring 30 is dimensioned to fit within the housing 12 at the axial ends of the rods 20, inserts 22 and blocks 23. When so positioned, the apertures 34 of the ring 30 mate with the bores 24 of the blocks 23 and the arches 33 form openings at the axial ends of the spaces 28 between the blocks 23. The balls 18 are then free to move through the apertures 34 into or out of the bores 24 in the blocks 23 or through the arches 33 into or out of the spaces 28 between the blocks 23 below the rods 20.

As shown in FIGURE 2, the outer end rings 31 have six projecting blisters 37 on their outer faces which define corresponding troughs 38 in their inner faces. When the ring 31 is in its position at the axial ends of the assembly, its inner surface mates with the outer surface of the ring 30 and the troughs 38 co-act with the arches 33, apertures 34 and domes 35 to form the curved end portions 16 and 17 of the raceways 13. Each of the troughs 38 is dimensioned so that one of its ends will lie axially beyond one of the arches 33 of the ring 30 while the other of its ends lies axially beyond the adjacent aperture 34 of the ring 30 with the center section of the trough 38 lying axially beyond the dome 35 between the arch 33 and the aperture 34.

The troughs 38 defined by the blisters 37 have a width great enough to freely receive the balls 18. The blisters 37 and the troughs 38 are elongated so that the opposite end walls of the trough 38 can mate with the walls of the arches 33 and the apertures 34 which are the greatest distance from each other. The troughs 38 have a depth greater in their middle sections than at their ends. The depth of the troughs at the middle section is slightly greater than the diameter of the balls 18 and the height of the dome 35 so that the balls 18 may freely pass over the dome 35 in the troughs 38. However, the depth of the troughs 38 decreases from the center thereof to the ends so as to force the balls moving in the troughs to enter either the apertures 34 or the arches 33.

The outer diameter portions of the rings 31 are received within the axial ends of the housing 12 and retained therein by resilient snap rings 39 which fit into grooves 40 formed in the inner surface of the housing 12 near its axial ends. The blisters 37 may extend axially beyond the ends of the housing 12. The grooves 40 are dimensioned apart so that when all of the components of the bearing assembly have been fitted into the housing 12 and the snap rings 39 have been placed in the grooves 40, the components will be held in tight axial relation.

In order properly to align the end cap rings 30 and 31 with the bores 24 and the spaces 28, pins 19 are provided. The pins 19 are received through apertures 19a in the end cap rings 30 and 31 into a hole 19b in the axial ends of one of the steel inserts 22. One end of each of the pins 19 bottoms in the hole 19b. The pins 19 are retained in the holes 19b and in the apertures 19a by abutment with the snap rings 39.

It can, therefore, be seen that the ball raceways are composed of the straight axial bores 24 in the blocks 23 and the straight spaces 28 between adjacent plastic blocks 23 and the troughs 38. The balls 18 which are in the spaces 28 are loaded into bearing relationship with the shaft 11 by the rods 20 while the balls in the bores 24 of the plastic pieces 23 and the troughs 38 defined by the blisters 37 are in an unloaded free state. Corresponding bores 24 and spaces 28 joined together by a trough 38 at one of the axial ends of the bearing assembly 10 are also joined together by a trough 38 at the other axial end of the bearing assembly 10 to provide endless raceways.

As relative movement between the shaft 11 and the bearing assembly 10 occurs, the balls 18 will move around the endless raceways 13. Over a period of use, wear may develop on the rods 20. When this occurs, the rods 20 may be removed by disengaging the snap rings 39 and removing the inner and outer end rings 30 and 31. Thereafter the rods 20 may be pulled or pushed out of the housing 12 for repair, inspection or replacement.

Tapering the end portions 21 of the rods 20 allows the balls 18 to be smoothly brought into or released from the bearing loaded state between the outside surfaces of the rods 20 and the shaft 11. The tapering also prevents the balls from encountering a shoulder at the end of the rods as the balls move in the endless raceways. In order to reduce friction, the blocks 23 and end cap rings 30 and 31 may be made of self-lubricating plastic such as nylon or the like.

The primary object of the steel inserts 22 is to prevent the two rods 20 in each pair from spreading apart when the bearing assembly 10 is used in a high load application. However, as shown in FIGURE 5, the steel inserts 22 can be replaced by use of a different form of molded block 42 in place of the block 23. In this embodiment, the molded block 42, which may be of plastic, extends radially in from the inner surface of the housing 12 to a point beyond the diameter of the balls 18 which are riding against the rods 20 in the loaded portion of the raceways. The radially outer portions of the blocks 42 are contoured to snugly engage the periphery of the rods 20 along their entire untapered length, while the radially inner portions of the sides may be contoured to provide a curved side wall for the loaded raceways radially below the rods 20. In this manner, the rods 20 in each pair are restrained against circumferential separation by the contoured radially outer portions of the sides of adjacent blocks 42 which also serve to define the sides of the loaded raceways.

Another method of eliminating the steel inserts 22 is shown in FIGURE 6. In this embodiment, circumferentially spaced portions 43 of the housing 12 are radially depressed to form internal abutment shoulders 44 circumferentially adjacent the rods 20. The depressed areas 43 of the housing 12 are those areas which lie radially outward from the blocks 23. As the balls 18 press radially against the rods 20, in each pair the rods are restrained against radially outward movement by the inner surface of the undepressed portions 45 of the housing 12 and are restrained against circumferential separation by the abutting shoulders 44 of the housing 12.

FIGURE 7 illustrates another embodiment of a removable bearing raceway. In this embodiment, the rods of previous embodiments are replaced by a metal strip 47. The strip 47 has a bottom face 48 which has a groove 49 which extends the longitudinal length of the strip 47. The balls 18 ride against the strip 47 in the groove 49.

The metal strip 47 can be used in place of the rods 20 shown in the embodiments illustrated in FIGURES 3, 5 and 6. However, FIGURE 7 illustrates a different embodiment of the invention which does not utilize a separate thin walled housing corresponding to the housing 12 of previous illustrations.

As shown in FIGURE 7, a cylinder, which may be of cast iron, molded plastic or the like, is utilized. The cylinder 50 has an axial bore 51 for receiving the shaft 52. The body portion of the cylinder 50 is wider than the wall of the housing 12 and has six axial bores 53 through it. The axial bores 53 are circumferentially spaced from each other and are radially spaced from the inner and the outer diameters of the cylinder 50. The bores 53 have a diameter slightly greater than the diameter of the balls 18 and function as the unloaded portions of the raceways.

Equidistant between the bores 53 are six axial bores 54 which are open to the central axial bore 51. The bores 54 have a diameter equal to or slightly greater than the diameter of the balls 18 and function as the loaded portions of the raceways. Channels 55 are provided axially through the body of the cylinder 50 radially adjacent the bores 54 for receiving the metal inserts 47, the grooves 49 of which form the radially outermost faces of the bores 54. In order to prevent the balls 18 from falling out of the bores 54 when the bearing assembly 56 is not receiving a shaft 11, the width of the opening of the bores 54 to the central axial bore 51 is less than the diameter of the balls 18.

As shown in FIGURE 8, the curved end portions 60 of the raceways are provided by end caps 61. The end caps 61 are axially thick rings which may be of cast iron, molded plastic or the like and which have an interior diameter equal to the interior diameter of the cylinder 50. U-shaped raceways 60 are formed in the body of the rings and have a diameter substantially the same as the diameter of the balls 18. The U-shaped raceways 60 are canted in the end cap 61 so that one leg 63 of the U is open to the interior diameter of the end cap 61. Crosspieces 62 in the end caps 61 serve to separate the legs of the U-shaped raceway 60. The crossbars 62 function to keep the balls 18 from becoming bunched up in the raceways 60 of the end caps 61. In operation, the end caps 61 axially abut the cylinder 50 with the legs 63 which are open to the interior diameter of the end caps 61 placed axially adjacent the bores 54 of the loaded portions of the raceways and the legs 64 of the U-shaped raceways 60 axially adjacent the bores 53. When the bearing 56 is in operation, the balls 18 are free to travel around the endless raceways through the bores 53 in unloaded state into the legs 64 of the U-shaped raceways 60 in the end caps 61, thence around the crossmember 62 and into the leg 63 where they are brought into engagement with the surface of the shaft 11. Upon leaving the legs 63 of the end cap and entering the bores 54, the balls are brought into bearing relationship with the shaft 11 by the metal strip 47.

Another embodiment of a removable raceway linear motion bearing is illustrated in FIGURE 11. In this embodiment interlocking inserts provide the two axially straight portions 14 and 15 of the raceway. Two types of inserts are used within the tubular housing 80. These are a loaded bearing raceway insert 81 and an unloaded return raceway insert 82. The inserts 81 and 82 alternate with each other around the inner diameter face 84 of the housing 80.

As best shown in FIGURE 15 the loaded bearing raceway 81 consists of an elongated metal strip with a curved outer face 83 the radius of curvature of which is the same as the radius of curvature of the inner diameter of the housing 80. As shown in FIGURE 12 the curved face 83 mates with the inner diameter face 84 of the housing 80 along the axial length of the loaded raceway strip 81. Extending inwardly from the curved face 83 are side faces 85 and 86 which terminate at a grooved bottom face. The side faces 85 and 86 are parallel for a portion of their distance and then converge toward each other for the remainder of their distance. A contoured groove 87 is formed along the axial length of the strip 81 on its bottom or radially inner side. The ball bearings 18 ride in the groove 87. The strip 81 has a radial height dimensioned so that the distance from the radially innermost portion 91 of the strip 81 to the shaft 11 received in the bearing is less than the diameter of the ball 18. The loaded raceway strip 81 may be of extruded and hardened steel, molded plastic or the like material.

Alternating with the loaded raceway strips 81 are return raceway strips 82 which may also be of extruded and hardened steel or molded plastic or the like. The return raceway strips 82 have a curved outer face 89 which has the same radius of curvature as the curved outer face 83 of the loaded raceway strips 81. Sidewalls 90 and 92 extend inward from the curved face 89. The sidewalls 90 and 92 converge toward each other for a part of their distance and then become parallel to each other for the remainder of their distance. The sidewalls 90 and 92 terminate a distance from the inner diameter of the housing 80 which is less than the distance from the inner diameter of the housing 80 to the outer diameter of the shaft 11. The bottom face 93 of the return raceway insert 82 is curved to match the curvature of the outer diameter of the shaft 11. The sidewalls 90 and 92 converge toward each other for the same distance that the sidewalls 85 and 86 of the loaded bearing raceways 81 are parallel to each other.

The angle of convergence of the sidewalls 90 and 92 is such that they will mate with the parallel portions of the sidewalls 85 and 86 of the loaded raceway inserts 81. The angle of convergence of the lower or radially innermost portions of the sidewalls 85 and 86 of the loaded raceway inserts 81 is such that they will mate with the parallel portions of the sidewalls 90 and 92 of the return raceway inserts 82. In this manner the alternate inserts 81 and 82 become interlocking when positioned around the inner diameter of the housing 80 as is shown in FIGURE 12. The sidewalls 90 and 92 of the return raceway insert 82 extend beyond the bottom or innermost portions 91 of the side walls 85 and 86 of the loaded raceway inserts 81 to a distance from the outer diameter of the shaft 11 which is less than the radius of the ball 18. The bottom or innermost points 94 of two adjacent return raceway strips 82 which are separated by a single loaded raceway insert 81 are spaced apart circumferentially a distance which is less than the diameter of the balls 18. In this manner the balls 18 are prevented from falling out of the space below the loaded raceway strips 81 and between the return raceway inserts 82.

The return raceway inserts 82 have axial bores 95 through them. The bores 95 have a diameter slightly greater than the diameter of the balls 18 and are spaced from the outer face 89 and the inner face 93 of the inserts 82. The axial bores 95 provide the return unloaded raceway portions for the balls.

The turnaround portions of the raceways which connect the ends of the straight portions are provided by inner and outer end cap rings 97 and 98. The end cap rings 97 and 98 shown in FIGURES 13 and 14 are the same as the end cap rings 30 and 31 shown in FIGURES 2 and 4 except that the end cap rings 97 and 98 are shown as modified to be used in a bearing having five endless raceways while the end cap rings 30 and 31 are to be used in a bearing having six endless raceways.

In the embodiment shown in FIGURE 11 the end cap rings 97 and 98 are retained in place by means of screws 99. The screws 99 are received through apertures 100 in the outer end cap ring 98. The apertures 100 are placed radially outward from the lower or loaded raceway end of the blisters 37. Corresponding apertures 101 are formed in the inner end cap ring 97 radially out from the arches 33. After passing through the apertures 100 and 101 the screws 99 are threaded into threaded holes 102 in the axial ends of the loaded raceway inserts 81. The threaded holes 102 are located radially outward from the top of the groove 87. In this embodiment because of the screw fastening of the inner and outer end cap rings 97 and 98 the housing 80 has an axial length which is the same as the axial length of the raceway inserts 81 and 82.

FIGURE 17 illustrates another embodiment of this invention. In this embodiment, the housing 70 which corresponds to the housing 12 of earlier embodiments contains a number of hollow tubes 71 which are circumferentially spaced around the inner surface of the housing 70. The interior diameter of the tubes 71 is slightly greater than the diameter of the balls 72. The tubes 71 are circumferentially spaced from each other by a distance which is less than the diameter of the balls 72.

Balls 72 are then arranged between two adjacent tubes 71 and ride between the two adjacent tubes engaging their outer diameters. The balls also contact the shaft 11 radially in from the tube 71. In this embodiment, the tubes may be secured to the housing 70 to prevent their circumferential movement or they may be left free, thereby giving the unit a self-aligning feature in that the balls 72 riding against adjacent tubes 71 circumferentially around the inside of the bearing housing 70 will act to keep the tubes 71 circumferentially spaced.

The tubes 71 extend approximately the axial length of the housing 70 with the axial ends of the housing 70 extending slightly beyond the ends of the tubes 71. The spaces between adjacent tubes 71 radially in from their diameters become the loaded raceways for the balls 72. A blistered end ring 73 is attached to the bearing unit at the axial ends of the tubes 71. The blisters 74 define troughs on the axial inner faces of the end rings 73. The troughs form the curved end portions of the raceways. When the end rings 73 are assembled at the axial ends of the hollow tubes 71, one of the ends of each trough is positioned to receive the balls from the loaded raceway between adjacent tubes 71, while the other end of the trough is positioned at the axial end of one of the hollow tubes 71. In this manner, the balls can pass from the loaded raceways between adjacent tubes 71 into one end of a trough, thence around the trough and out the other end into an adjacent hollow tube 71. The hollow tubes 71 then become the unloaded raceway portions.

In the self-aligning embodiment, where the tubes 71 are not secured to the housing 70, the end caps 73 are secured to the tubes 71 rather than to the housing 70 so that as use of the linear motion bearing causes the tubes 71 to realign themselves the end caps 73 remain in correct relationship with the tubes 71.

In order to prevent the balls 72 from falling out of the bearing assembly 75, contoured strips 76 may be attached to the end caps 73. The strips 76 extend axially the length of the assembly 75 from one end cap to the other. The strips 76 are contoured to fit radially below the tubes 71 and between adjacent loaded raceways. The side walls of the strips 76 are concavely contoured to fit partially around the balls in the loaded raceway, and the radially inner faces of the strips 76 extend radially below the diameter of the balls 72 in the loaded raceways, thereby preventing the balls from dropping out of the bearing assembly without interfering with the self-aligning feature.

In the self-aligning version of this embodiment, where the tubes 71 are not attached to the housing, circumferential rotation of the housing with respect to the shaft is provided for with the tubes 71 and the balls 72 acting as anti-friction bearings between the housing and the shaft inasmuch as both are free to rotate within the housing. This circumferential rotation is in addition to the linear movement of the bearing, thereby providing a bearing which is capable of movement with respect to the shaft in two directions.

A further modification (not shown) of this embodiment may be utilized where higher load capabilities are desired. In such a modification, the tubes 71 can be made solid rather than hollow. Ball return paths corresponding to the unloaded portions of the raceways can then be through tubes which extend axially from one end of the unit 75 to the other and which are positioned outside of the housing. In such a modification, the end cap 73 would have a greater diameter than the housing 70 and the blisters 74 would extend radially beyond the housing. Further, in such a modification, the end caps 73 would be at the axial ends of the housing 70 which would terminate at the axial ends of the rods 71. In such a modification, as in all of the illustrated embodiments, it can be seen that the invention described provides for a linear motion ball bearing in which the ball bearings in the loaded portion of the raceway do not contact the bearing housing, but rather ride against and are loaded by removable raceway defining portions.

Although minor modifications might be suggested by those versed in the art, it should be understood that we wish to embody within the scope of the patent warranted thereon, all such embodiments as reasonably and properly come within the scope of our contribution to the art.

We claim as our invention:

1. A linear motion antifriction ball bearing for use on a shaft which comprises: a housing having a bore receiving a shaft; a plurality of endless ball raceways disposed between said shaft and said housing circumferentially spaced around said housing; balls substantially filling said raceways; said raceways having ball loading portions, loaded ball paths, and ball return portions; said ball loading portions having bearing surfaces effective to load the balls in said loaded ball paths into loaded bearing engagement with said bearing surfaces and said shaft; said ball paths defined on their radially outer side by said bearing surfaces, each of said ball return portions defined by axial bores through a return member having chordally directed side walls, said paths and return members circumferentially alternating in said housing, the balls in said races circumferentially entrapped between portions of the adjacent return member's side walls whereby the balls in said paths are retained therein; said bearing surfaces separate from said ball return portions and removable from said housing independently of said ball return portions.

2. The bearing of claim 1 wherein the housing is a thin walled tube and the raceways have two straight portions axially disposed in the housing, one of which is the ball loading portion; said straight portions being connected by two curved end portions; and said end portions being defined by two end cap rings which are attached to the housing adjacent either end thereof.

3. The bearing of claim 1 wherein the bearing surfaces include pairs of elongated rods.

4. In a linear motion ball bearing having endless ball filled raceways, portions of which include bearing surfaces for loading the balls into bearing relationship with a shaft received through the bearing and portions of which constitute unloaded return paths for the balls, the improvement of means for removably receiving within said bearing at least one of said bearing surfaces independently of said return paths and said balls retained in the said bearing independently of a shaft received in said bearing, said unloaded return path portions comprising a member with an axial bore therethrough defining the return path, said member having radial wall configurations defining circumferential side walls for the loaded ball passages, and said radial wall configurations adapted to retain balls in said loaded ball paths.

5. An antifriction bearing for linear movement along a shaft which comprises: a casing having a shaft receiving bore; elongated first ball passages having internal surfaces in said casing communicating along their lengths with said bore; second ball passages having axial portions in said casing and end portions each communicating with the ends of said first ball passages to form endless ball passageways; removable bearing surface members associated with said first ball passages effective to load balls in the first ball passages into bearing relationship with a shaft received in said bore, said bearing surface members replaceable in said casing without replacing said second ball passages, said passages filled with balls, said axial portions including an axially extending member having a bore therethrough defining an axial return ball passage, said axial portions having radial side configurations defining the side walls of said first ball passages, said side walls entrapping said balls in said first ball passages, and said balls retained in said bearing independently of said shaft.

6. The bearing of claim 5 wherein the bearing surface members are elongated strips each having a contoured surface which is positioned to form a part of the internal surface of the first ball passages.

7. An antifriction bearing for linear movement along a shaft which comprises: a tubular housing having an inner diameter greater than the outer diameter of the shaft; a plurality of circumferentially spaced pairs of rods disposed around the inner diameter of said housing; spacing means between said pairs of rods effective to prevent circumferential separation of the rods in each pair; a plurality of circumferentially spaced ball raceway means within said housing; said ball receway means having radial side wall configurations effective to define raceway areas radially below said pairs of rods and between adjacent raceway means; said rods, spacing means, raceway means and raceway areas extending axially of said housing; end cap rings associated with the axial ends of said housing; said end cap rings including a plurality of ball raceway passages connecting the axial ends of each of said raceway means with the axial ends of one of said raceway areas; balls substantially filling said raceway means, raceway areas and raceway passages; said walls entrapping the balls in said areas effective to prevent them from radially dropping out of said areas; said rods effective to load the balls in said raceway areas into bearing loaded engagement with a shaft received through said housing, and said rods removable therefrom independently of said raceway means.

8. An antifriction bearing for linear movement along a shaft which comprises: a tubular housing having an inner diameter greater than the outer diameter of the shaft, removable bearing surface members and unloaded raceway members alternately disposed around said inner diameter of said housing between said housing and said shaft, axial ball passages in said unloaded raceway members, said unloaded raceway members having axially extending side wall configurations effective to define axial raceway areas radially inward of said removable bearing surface members, end cap means secured to the axial ends of said housing, said end cap means including ball pathways connecting said ball passages and said raceway areas; ball bearings in said ball pathways, ball passages and raceway areas, said bearing surface members removable from said housing independently of said raceway members and including said side wall configurations retaining said balls in said housing independently of said shaft.

9. The bearing of claim 8 wherein the removable bearing surface members and the unloaded raceway members are in interlocking relationship around the interior diameter of the shaft.

10. The bearing of claim 8 wherein the end cap means is effective to direct the balls from the raceway areas to an adjacent raceway passage and from the raceway passages to an adjacent raceway area thereby providing endless raceways within said housing.

11. A linear motion ball bearing comprising: a cylindrical housing, a plurality of endless ball pathways circumferentially disposed within said housing, each of said pathways including a loaded ball passage, an unloaded ball passage, and connecting passages, said connecting passages defined in removable end caps associated with said housing at either end of the loaded and unloaded passages, each pathway filled with a string of ball bearings, each loaded ball passage having removable bearing surface means therein for loading the balls in the said loaded ball passage into engagement with a shaft received through said housing, said bearing surfaces removable from the said housing independently of the said unloaded ball passages, said unloaded ball passages defined by an axially extending bore in an unloaded ball passage member, and the said unloaded ball passage member having radial wall configurations circumferentially entrapping the balls in the loaded ball passages to retain them therein independently of the presence of a shaft within the said housing.

References Cited

UNITED STATES PATENTS

| | | |
|---|---|---|
| 640,397 | 1/1900 | Merker. |
| 2,452,117 | 10/1948 | Ferger. |
| 2,509,749 | 5/1950 | Thomson. |
| 2,620,163 | 12/1952 | Stone. |
| 2,929,661 | 3/1960 | Brown. |
| 3,360,308 | 12/1967 | Grabowski. |
| 2,908,152 | 10/1959 | Anderson. |
| 3,044,835 | 7/1962 | Hurd. |
| 3,086,824 | 4/1963 | Barkley. |
| 3,311,426 | 3/1967 | Binns. |
| 3,398,999 | 8/1968 | Halvorsen. |

FOREIGN PATENTS

| | | |
|---|---|---|
| 151,910 | 3/1963 | U.S.S.R. |
| 1,350,657 | 12/1964 | France. |
| 836,261 | 6/1960 | Great Britain. |
| 989,955 | 4/1965 | Great Britain. |
| 286,214 | 10/1952 | Switzerland. |

MARTIN P. SCHWADRON, Primary Examiner

L. L. JOHNSON, Assistant Examiner